United States Patent
Tristan et al.

(10) Patent No.: US 10,394,872 B2
(45) Date of Patent: Aug. 27, 2019

(54) LEARNING TOPICS BY SIMULATION OF A STOCHASTIC CELLULAR AUTOMATON

(71) Applicant: Oracle International Corporation, Redwood Shores, CA (US)

(72) Inventors: Jean-Baptiste Tristan, Lexington, MA (US); Stephen J. Green, Wakefield, MA (US); Guy L. Steele, Jr., Lexington, MA (US); Manzil Zaheer, Pittsburgh, PA (US)

(73) Assignee: Oracle International Corporation, Redwood Shores, CA (US)

( * ) Notice: Subject to any disclaimer, the term of this patent is extended or adjusted under 35 U.S.C. 154(b) by 405 days.

(21) Appl. No.: 14/932,825

(22) Filed: Nov. 4, 2015

(65) Prior Publication Data
US 2016/0350411 A1 Dec. 1, 2016

Related U.S. Application Data

(60) Provisional application No. 62/168,608, filed on May 29, 2015.

(51) Int. Cl.
G06F 16/35 (2019.01)
G06F 16/951 (2019.01)
G06F 16/33 (2019.01)

(52) U.S. Cl.
CPC ........ *G06F 16/353* (2019.01); *G06F 16/3344* (2019.01); *G06F 16/951* (2019.01)

(58) Field of Classification Search
CPC ........... G06F 17/3028; G06F 17/30882; G06F 16/353
See application file for complete search history.

(56) References Cited

U.S. PATENT DOCUMENTS

| | | | |
|---|---|---|---|
| 8,484,245 B2 | 7/2013 | Ha-Thuc | |
| 2009/0192980 A1* | 7/2009 | Beyer | G06F 17/30469 |
| 2012/0095952 A1 | 4/2012 | Archambeau | |
| 2012/0117008 A1* | 5/2012 | Xu | G06F 9/5061 |
| | | | 706/12 |
| 2013/0073387 A1* | 3/2013 | Heath | G06Q 30/02 |
| | | | 705/14.53 |
| 2014/0129510 A1 | 5/2014 | Vladislav | |
| 2014/0149433 A1 | 5/2014 | Lakshminarayan | |

(Continued)

OTHER PUBLICATIONS

"An alias method for sampling from the normal distribution" Computing, 1989, vol. 42, No. 2-3, p. 159 J. H. Ahrens, U. Dieter.*

(Continued)

*Primary Examiner* — Mariela Reyes
*Assistant Examiner* — Courtney Harmon
(74) *Attorney, Agent, or Firm* — Hickman Palermo Becker Bingham LLP

(57) ABSTRACT

Herein is described an unsupervised learning method to discover topics and reduce the dimensionality of documents by designing and simulating a stochastic cellular automaton. A key formula that appears in many inference methods for LDA is used as the local update rule of the cellular automaton. Approximate counters may be used to represent counter values being tracked by the inference algorithms. Also, sparsity may be used to reduce the amount of computation needed for sampling a topic for particular words in the corpus being analyzed.

14 Claims, 3 Drawing Sheets

(56) References Cited

U.S. PATENT DOCUMENTS

| | | | |
|---|---|---|---|
| 2014/0181214 A1 | 6/2014 | Price | |
| 2015/0095277 A1 | 4/2015 | Tristan | |
| 2015/0193535 A1* | 7/2015 | Balmin | G06Q 30/0201 707/706 |
| 2015/0254021 A1* | 9/2015 | Hu | H04L 51/22 710/55 |
| 2016/0210718 A1 | 7/2016 | Tristan et al. | |
| 2016/0224544 A1 | 8/2016 | Tristan et al. | |
| 2016/0224900 A1 | 8/2016 | Steele, Jr. | |
| 2016/0330144 A1* | 11/2016 | Dymetman | H04L 51/02 |
| 2017/0039265 A1 | 2/2017 | Steele | |
| 2017/0154077 A1 | 6/2017 | Kang | |
| 2019/0114319 A1 | 4/2019 | Tristian | |

OTHER PUBLICATIONS

Tristan, U.S. Appl. No. 14/755,312, filed Jun. 30, 2015, Notice of Allowance, dated Mar. 10, 2017.
Freitas et al., "Bayesian Latent Semantic Analysis of Multimedia Databases" Technical Report, dated Oct. 22, 2001, 36 pages.
A. U. Neumann et al., "Finite size scaling study of dynamical phase transitions in two dimensional models : Ferromagnet, symmetric and non symmetric spin glasses", J. Phys. France 49 (1988), 10 pages.
Lu et al., "Accelerating Topic Training on a Single Machine", APWeb dated 2013, 12 pages.
Liu et al., "PLDA+:Parallel Latent Dirichlet Allocation with Data Placement and Pipeline Processing", ACM, dated 2011, 18 pages.
Li et al., "Reducing the Sampling Complexity of Topic Models", ACM, dated Aug. 2014, 10 pages.
Lebowitz et al., "Statistical Mechanics of Probabilistic Cellular Automata", Journal of Statistical Physics, vol. 59, Nos. 1/2, 1990, 54 pages.
Jiang et al., "A Method of Accelerating LDA Program with GPU", 2012 Third International Conference on Networking and Distributed Computing IEEE, 2012, 4 pages.
Miklos, Csuros, "Approximate counting with a oating-point counter", dated 2010, 16 pages.
Griffiths et al., "Finding Scientific Topics" Colloquium, PNAS, vol. 101, dated Apr. 6, 2004, 8 pages.
Morris, Robert, "Counting Large Numbers of Events in Small Registers", Programming Techniques, AMC, dated Oct. 1978, 3 pages.
D.P. Landau et al., "Test of parallel updating in Ising model simulation", HAL Id: jpa-00210932, Submitted on Jan. 1, 1989, 5 pages.
D. A. Dawson, "Synchronous and Asynchronous Reversible Markov Systems", Canad. Math. Bull. vol. 17 (5), 1975, 17 pages.
Chang et al., "Reading Tea Leaves: How Humans Interpret Topic Models" dated 2009, 9 pages.
Celeux et al., "On Stochastic Versions of the EM Algorithm", INRIA, dated Mar. 1995, 25 pages.
Blei, David, "Probabilistic Topic Models", Surveying a suite of algorithms that offer a solution to managing large document archives, Apr. 2012 | vol. 55 | No. 4 | communications, AMC, 8 pages.
Blei, David, "Latent Dirichlet Allocation", Journal of Machine Learning Research 3 (Jan. 2003) 993-1022, 30 pages.
Asuncion et al., "On Smoothing and Inference for Topic Models", UAI 2009, 8 pages.
Hoffman et al., "Stochastic Variational Inference", Journal of Machine Learning Research 14 (2013) 1303-1347, Submitted Jun. 2012; Published May 2013, 45 pages.
Vichniac, Grrard Y., "Simulating Physics With Cellular Automata", North-Holland, Amsterdam, Elsevier Science Publishers B.V., dated 1984, 21 pages.
Yao et al., "Efficient Methods for Topic Model Inference on Streaming Document Collections", KDD, dated 2009, ACM, 9 pages.
Yan et al., "Parallel Inference for Latent Dirichlet Allocation on Graphics Processing Units" dated 2009, 9 pages.
Wikipedia, "Approximate Counting Algorithm", last accesed on May 7, 2015, http://en.wikipedia.org/wiki/Approximate_counting_algorithm, 2 pages.
Wikipedia the free encyclopedia, "alias method", https://en.wikipedia.org/wiki/Alias_method, last viewed on Sep. 24, 2015, 2 pages.
Wang et al., "PLDA: Parallel Latent Dirichlet Allocation for Large-Scale Applications" AAIM, dated 2009, 14 pages.
Wallach et al., "Rethinking LDA: Why Priors Matter" dated 2009, 9 pages.
Mairesse et al., "Accepted Manuscript", Around probabilistic cellular automata, Theoretical Computer Science, dated Sep. 29, 2014, 48 pages.
Walker, Alastair J., "An Efficient Method for Generating Discrete Random Variables With General Distributions", dated 1977, 4 pages.
Yee Whye The et al, "A Collapsed Variational Bayesian Inference Algorithm for Latent Dirichlet Allocation", dated 2007, 8 pages.
Tristan et al., "Learning Topics with Stochastic Cellular Automata Dynamics", 9 pages.
Tristan et al., "Efficient Training of LDA on a GPU by Mean-for-Mode Estimation", Proceedings of the 32 nd International Conference on Machine Learning, Lille, France, 2015, 10 pages.
Smola et al., "An Architecture for Parallel Topic Models" Proceedings of the VLDB Endowment, vol. 3, No. 1, dated 2010, 8 pages.
Rauch, Eric, "Discrete, amorphous physical models", for a special issue on the Digital Perspectives workshop, dated Jul. 2001, 22 pages.
Porteous et al., "Fast Collapsed Gibbs Sampling for Latent Dirichlet Allocation" KDD' dated 2008, ACM, 9 pages.
Pierre-Yves Louis, "Automates Cellulaires Probabilistes : mesures stationnaires, mesures de Gibbs associees et ergodicite", HAL Id: tel-00002203, Submitted on Dec. 26, 2002, 207 pages.
Newman et al., "Distributed Algorithms for Topic Models", Journal of Machine Learning Research, dated 2009, 28 pages.
Wallach et al., "Evaluation Methods for Topic Models" Proceedings of 26th International Conference on Machine Learning Monteral, Canada, dated 2009, 8 pages.
Tristan, U.S. Appl. No. 14/599,272, filed Jan. 16, 2015, Office Action, dated Sep. 5, 2017.
Tristan, U.S. Appl. No. 14/599,272, filed Jan. 16, 2015, Final Office Action, dated Nov. 15, 2017.
U.S. Appl. No. 14/755,312, filed Jun. 30, 2015, Office Action, dated Oct. 3, 2016.
Zhao, Huasha, Jiang, Biye, and Canny, John. "SAME But Different: Fast and High-quality Gibbs Parameter Estimation". CoRR, abs/1409.5402, 2014, 10 pages.
Steele, JR., U.S. Appl. No. 14/820,169, filed Aug. 6, 2015, Notice of Allowance, dated Jul. 23, 2018.
Tristan, U.S. Appl. No. 14/599,272, filed Jan. 16, 2015, Advisory Action, dated Jan. 24, 2018.
Steele Jr, U.S. Appl. No. 14/820,169, filed Aug. 6, 2015, Office Action, dated Feb. 27, 2018.
Brown, U.S. Appl. No. 15/074,248, filed Mar. 18, 2016, Notice of Allowance, dated Apr. 24, 2018.

* cited by examiner

FIG. 2

202 — RECEIVE INFORMATION FOR A SET OF DOCUMENTS; WHEREIN THE SET OF DOCUMENTS COMPRISES A PLURALITY OF WORDS; WHEREIN A PARTICULAR DOCUMENT OF THE SET OF DOCUMENTS COMPRISES A PARTICULAR WORD OF THE PLURALITY OF WORDS

204 — RUN AN INFERENCE ALGORITHM OVER A DIRICHLET DISTRIBUTION OF THE PLURALITY OF WORDS IN THE SET OF DOCUMENTS TO PRODUCE SAMPLER RESULT DATA

206 — RETRIEVE A FIRST COUNTER VALUE FROM A FIRST DATA STRUCTURE

208 — BASED, AT LEAST IN PART, ON THE FIRST COUNTER VALUE, ASSIGN A PARTICULAR TOPIC, OF A PLURALITY OF TOPICS, TO THE PARTICULAR WORD IN THE PARTICULAR DOCUMENT TO PRODUCE A TOPIC ASSIGNMENT FOR THE PARTICULAR WORD

210 — AFTER ASSIGNING THE PARTICULAR TOPIC TO THE PARTICULAR WORD, UPDATE A SECOND COUNTER VALUE IN A SECOND DATA STRUCTURE, WHEREIN THE SECOND COUNTER VALUE REFLECTS THE TOPIC ASSIGNMENT, AND WHEREIN THE FIRST DATA STRUCTURE IS DISTINCT FROM THE SECOND DATA STRUCTURE

212 — DETERMINE, FROM THE SAMPLER RESULT DATA, ONE OR MORE SETS OF CORRELATED WORDS

LEARNING TOPICS BY SIMULATION OF A STOCHASTIC CELLULAR AUTOMATON

CROSS-REFERENCE TO RELATED APPLICATIONS; BENEFIT CLAIM

This application claims the benefit of Provisional Appln. 62/168,608, filed May 29, 2015, the entire contents of which is hereby incorporated by reference as if fully set forth herein, under 35 U.S.C. § 119(e).

This application is also related to the following applications, the entire contents of each of which is hereby incorporated by reference as if fully set forth herein:
  application Ser. No. 14/599,272, filed Jan. 16, 2015, titled "DATA-PARALLEL PARAMETER ESTIMATION OF THE LATENT DIRICHLET ALLOCATION MODEL BY GREEDY GIBBS SAMPLING";
  application Ser. No. 14/820,169, filed Aug. 6, 2015, titled "METHOD AND SYSTEM FOR LATENT DIRICHLET ALLOCATION COMPUTATION USING APPROXIMATE COUNTERS"; and
  application Ser. No. 14/755,312, filed Jun. 30, 2015, titled "A SPARSE AND DATA-PARALLEL INFERENCE METHOD AND SYSTEM FOR THE LATENT DIRICHLET ALLOCATION MODEL".

FIELD OF THE INVENTION

The present invention relates to automatically identifying topics for words in a data corpus, and, more specifically, to an inference algorithm learning topics for words in a data corpus based on simulation of a stochastic cellular automaton.

BACKGROUND

The automatic and unsupervised discovery of topics in unlabeled data may be used to improve the performance of various kinds of classifiers (such as sentiment analysis) and natural language processing applications. Being unsupervised is both a blessing and a curse. It is a blessing because good labeled data is a scarce resource, so improving tools that depend on labeled data by extracting knowledge from the vast amounts of unlabeled data is very useful. It is a curse because the methods used to discover topics are generally computationally intensive.

A topic model—which is a probabilistic model for unlabeled data—may be used for the automatic and unsupervised discovery of topics in unlabeled data, such as a set of textual documents. Such a topic model is designed with the underlying assumption that words belong to sets of topics, where a topic is a set of words. For example, given a set of scientific papers, a topic model can be used to discover words that occur together (and therefore form a topic). One topic could include words such as "neuroscience" and "synapse", while another topic could include words such as "graviton" and "boson".

Topic models have many applications in natural language processing. For example, topic modeling can be a key part of text analytics such as Name Entity Recognition, Part-of-Speech Tagging, retrieval of information for search engines, etc. Topic modeling, and latent Dirichlet allocation (LDA) in particular, has become a must-have of analytics platforms and consequently it needs to be applied to larger and larger datasets.

Many times, applying methods of topic modeling to very large data sets, such as billions of documents, takes a prohibitive amount of time. As such, it would be beneficial to implement a topic modeling algorithm that produces good topic modeling results in less time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for an inference algorithm, running over a Dirichlet distribution, that utilizes two data structures storing copies of counter values such that each iteration of the inference algorithm reads counter values from one data structure and updates counter values in the other.

DETAILED DESCRIPTION

Figure 1:
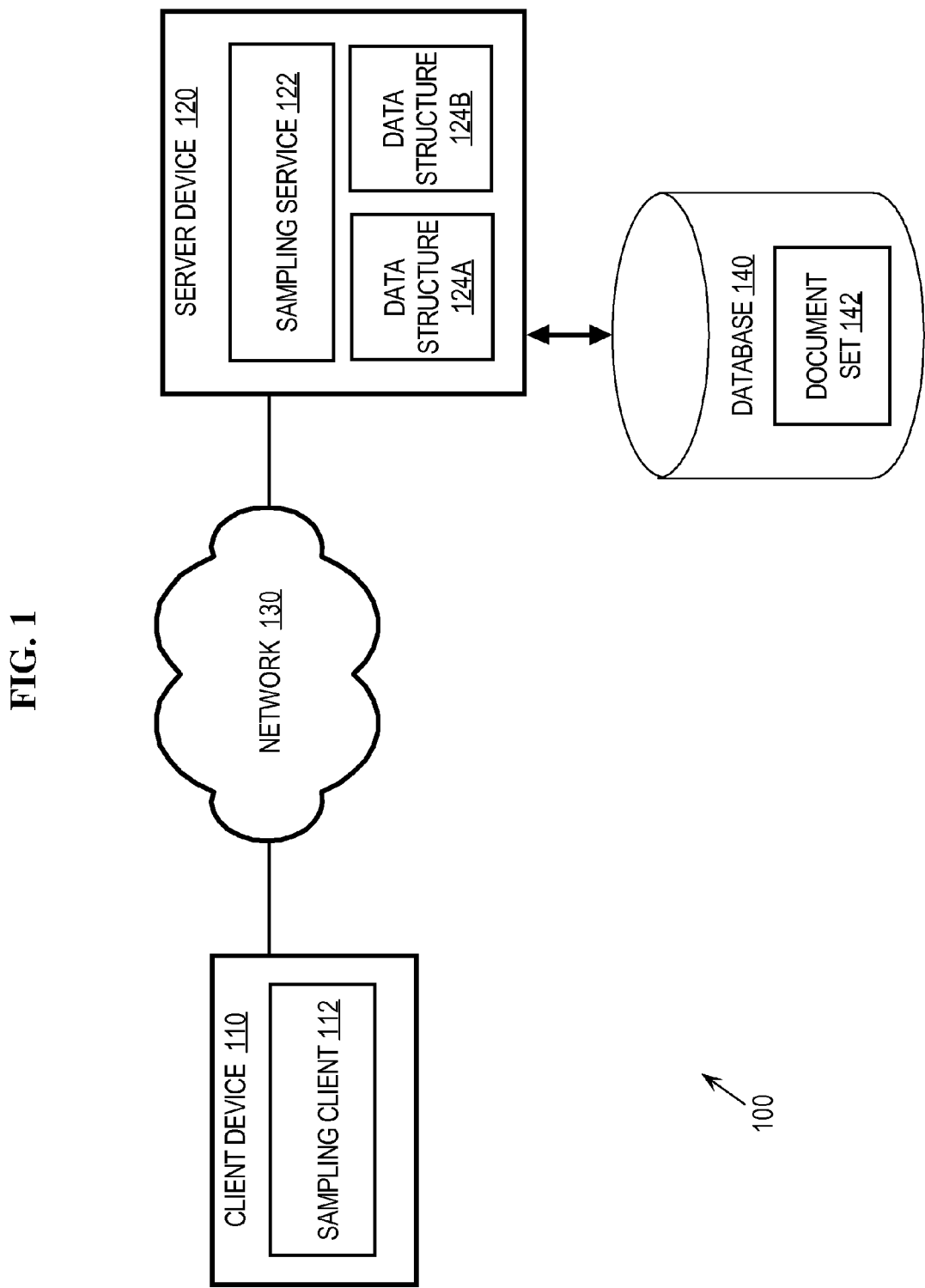
FIG. 1 is a block diagram that depicts an example network arrangement for a model sampling system that simulates a stochastic cellular automaton.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Many excellent topic modeling systems have been built, most of which have at their core one of two algorithms: either collapsed Gibbs sampling (CGS) or collapsed variational Bayesian inference (more specifically its zero-order Taylor expansion, CVB0). Interestingly, even though these two algorithms are born out of two different approaches to Bayesian inference, Markov Chain Monte Carlo (MCMC) simulation and mean-field approximation, their implementations are strikingly similar ways of repeating the same computation (i.e., Formula (1)) of proportions of topic usage over and over again.

$$(D_{mk} + \alpha) \times \frac{W_{kv} + \beta}{T_k + \beta V} \quad (1)$$

Specifically, both MCMC simulation and mean-field approximation decide how important is some topic k to the word v appearing in document m by asking the questions: "How many times does topic k occur in document m?", "How many times is word v associated with topic k?", and "How prominent is topic k overall?". It is reassuring that behind all of these beautiful mathematics, something quite simple and intuitive is happening.

According to embodiments, instead of deriving a topic modeling algorithm as an inference for the LDA model, a parallel and distributed algorithm is constructed around Formula (1), which is taken as the fundamental brick that makes topics appear from a set of documents. Such a parallel and distributed algorithm is based on the theory of stochastic cellular automata.

In the context of topic modeling, and according to embodiments, Formula (1) is selected as (part of) the stochastic local update rule and the initial state of the automaton is configured using the dataset in such a way that a simulation uncovers topics. Clearly, such a method has interesting similarities to both a (collapsed) Gibbs sampler and a (collapsed) variational inference, but it has many computational advantages and is indeed an effective scalable algorithm.

As such, herein is described an unsupervised learning method to discover topics and reduce the dimensionality of documents by designing and simulating a stochastic cellular automaton. Embodiments are as good as state-of-the-art learning algorithms based on probabilistic modeling in terms of quality of learning, but it is embarrassingly parallel, uses 20% less memory, and runs about 5 times faster. This algorithm parallelizes and distributes well, and it is as good statistically as other statistical inference algorithms for topic modeling. This idea generalizes to a larger class of important models known as latent variable models, which are key building blocks for unsupervised or deep machine learning algorithms.

Architecture for Sparse Model Sampling

FIG. 1 is a block diagram that depicts an example network arrangement 100 for a model sampling system that simulates a stochastic cellular automaton, according to embodiments. Network arrangement 100 includes a client device 110 and a server device 120 communicatively coupled via a network 130. Example network arrangement 100 may include other devices, including client devices, server devices, cluster nodes, and display devices, according to embodiments.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a sampling client 112. Sampling client 112 may be implemented in any number of ways, including as a stand-alone application running on client device 110, as a plugin to a browser running at client device 110, etc. Sampling client 112 may be implemented by one or more logical modules. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with a sampling service 122 and at least two data structures 124A and 124B, which are described in further detail below. Data structures 124A and 124B may be implemented in any way, within embodiments, that allows a first set of data to be stored and accessed, in data structure 124A, independently of storage and access to a second set of data stored in data structure 124B.

Any of the functionality attributed to sampling service 122 herein may be performed by another entity running on server device 120, or by an entity on client device 110 or on other devices that are communicatively coupled to network 130, according to embodiments. Server device 120 may be configured with other mechanisms, hardware, processes, and functionalities, depending upon a particular implementation.

Server device 120 is communicatively coupled to database 140. Database 140 maintains information for a document set 142. Database 140 may reside in any type of storage, including volatile and non-volatile storage (e.g., random access memory (RAM), a removable or disk drive, main memory, etc.), and may be implemented by one or more logical databases. The storage on which database 140 resides may be external or internal to server device 120.

Sampling client 112 and/or sampling service 122 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, sampling client 112 and/or sampling service 122 may send one or more communications, using any of the above protocols or any other communication protocol, over network 130 to other entities communicatively coupled to network 130, according to embodiments.

In an embodiment, each of the processes described in connection with sampling client 112, and/or sampling service 122 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Cloud Computing System

According to embodiments, server device 120 is part of a cloud or clustered computing system. A cloud or clustered computing system is a computing system that includes a collection of hardware and software components that function together to provide functionality such as, for example, storing data, processing commands, and/or providing services (such as the services described herein in connection with sampling service 122). In the context of the cloud computing system, server device 120 is a distinct active functional component that, according to embodiments, works with other distinct functional components to accomplish a particular task that the cloud computing system is requested to perform. According to embodiments, other distinct active functional components that are also part of the system provide the same functionality in parallel.

Underlying logical components of the cloud system may be replaced by different logical components without affecting the overall functionality of the cloud system. The complexity of the cloud system may be hidden from a client of the cloud system, such as a user or application, such that the client (i.e., operating at client device 110) may not even need to be aware which software or hardware is being used by the system, as long as the functionality is provided from the system to the client.

To shield the client from the complexities of the cloud, many cloud systems include a client interface (e.g., at sampling client 112), and a component interface. The client interface exposes simple commands to the client in the form of an interface such as an application programming interface or a graphical user interface. The commands expose functionality of the cloud system to the client such that, when the cloud system receives commands from the client on the client interface, the cloud system carries out the requested function using one or more of a variety of functional components, such as server device 120, that may be hidden from the client. Several clients may be serviced by the cloud system in parallel using parallel instances of the client interface.

Distributed, Parallel, and Approximate Inference for LDA

In LDA, each document m of a corpus of M documents is modeled as a distribution $\theta_m$ that represents a mixture of topics. There are K such topics, and each topic k is modeled as a distribution $\phi_k$ over the vocabulary of words that appear in the corpus. Each document m contains $N_m$ words $W_{mn}$ from a vocabulary of size V, and a latent variable $Z_{mn}$ is associated with each of the words. The latent variable for each word can take one of K values that indicates a topic to which the word belongs. Each of the distributions $\theta_m$ and $\phi_k$ are given a Dirichlet prior, parameterized respectively with a constant $\alpha$ and $\beta$. More concisely, LDA has the following mixed density.

$$p(w, z, \theta, \phi) = \left[\prod_{m=1}^{M}\prod_{n=1}^{N_m} Cat(w_{mn} \mid \phi_{z_{mn}}) Cat(z_{mn} \mid \theta_m)\right]\left[\prod_{m=1}^{M} Dir(\theta_m \mid \alpha)\right] \quad (2)$$

$$\left[\prod_{k=1}^{K} Dir(\phi_k \mid \beta)\right]$$

The choice of a Dirichlet prior is not a coincidence: all of the variables $\theta_m$ and $\phi_k$ can be integrated to obtain the following closed form solution:

$$p(w, z) = \left[\prod_{m=1}^{M} Pol(\{z_{m'n} \mid m' = m\}, K, \alpha)\right] \quad (3)$$

$$\left[\prod_{k=1}^{K} Pol(\{w_{mn} \mid z_{mn} = k\}, V, \beta)\right]$$

where Pol is the following Polya distribution:

$$Pol(S, X, \eta) = \frac{\Gamma(\eta K)}{\Gamma(|S| + \eta X)} \prod_{x=1}^{X} \frac{\Gamma(|\{z \mid z \in S, z = x\}| + \eta)}{\Gamma(\eta)} \quad (4)$$

Many highly effective inference algorithms for LDA use this collapsed form as a starting point, as do embodiments described herein. Specifically, embodiments perform inference on the distribution p(z|w) to obtain good estimates for the values of the $\theta_m$ and $\phi_k$ parameters. These estimates have the following definitions:

$$\theta_{mk} = \frac{D_{mk} + \alpha}{N_m + \alpha K} \quad (5)$$

$$\phi_{kv} = \frac{W_{kv} + \beta}{T_k + \beta V} \quad (6)$$

where $D_{mk}$ is the number of latent variables in document m that equal k, $W_{kv}$ is the number of latent variables equal to k and whose corresponding word equals v, and $T_k$ is the number of latent variables that equal k. More formally, $$D_{mk} = |\{z_{mn} \mid z_{mn} = k\}|, W_{kv} = |\{z_{mn} \mid w_{mn} = v, z_{mn} = k\}|, \text{ and}$$

$$T_k = |\{z_{mn} \mid z_{mn} = k\}| = \sum_{v=1}^{V} W_{kv}.$$

Many of the scalable systems for topic modeling are based on one of two inference methods: the collapsed Gibbs sampler (CGS), and the collapsed variational Bayesian inference and its zero-order Taylor approximation (CVB0).

To apply LDA to large datasets, or for efficiency reasons, the inference algorithm (e.g., CGS and CVB0) being utilized may need to be distributed and parallelized, according to embodiments. Both CGS and CVB0 can be approximated to meet such implementation requirements.

Collapsed Gibbs Sampling

In collapsed Gibbs sampling, first the full conditional distribution of an arbitrary latent variable is derived given all the others from equation (3).

$$p(z_{mn} = k \mid z^{-mn}, w) \propto (D_{mk} + \alpha) \times \frac{W_{kw_{mn}} + \beta}{T_k + \beta V} \quad (7)$$

CGS is a sequential algorithm where latent variables are drawn in turn, and the process is repeated for several iterations, and is described in further detail below. This algorithm is very effective statistically, and has benefited from breakthroughs that lead to a reduction of the sampling complexity. Note that a more precise definition would exclude the current value of $z_{mn}$ from the counts, but it is customary to approximate and consider the value of $z_{mn}$ as part of the counts. This is computationally effective and makes little difference statistically, and as such, embodiments approximate and consider the value of $z_{mn}$ as part of the counts.

The algorithm for CGS can be approximated to enable distribution and parallelism. Indeed, some very efficient systems are built following the idea of the AD-LDA algorithm, an approximate distributed version of collapsed Gibbs sampling. In AD-LDA, the dataset is partitioned into P disjoint subsets. Within one iteration, each partition is processed independently using a collapsed Gibbs sampler; at the end of each iteration, the disjoint samplers share and update their respective W counts so that they all have the same values for the next iteration.

Collapsed Variational Bayes

In collapsed variational inference, the parameters $\gamma_{mnk}$, of an approximate distribution that assumes independence of the latent variables, are computed. To that end, the free energy of the approximate distribution is minimized for a given parameter $\gamma_{mnk}$ and then a zero-order Taylor expansion may be used.

$$\gamma_{mnk} \propto (D_{mk} + \alpha) \times \frac{W_{kw_{mn}} + \beta}{T_k + \beta V} \quad (8)$$

Then all of the variational parameters are computed and the algorithm is iterated until (a) the topics are satisfactory, or (b) until convergence. CVB0 can be turned into a distributed parallel algorithm by parallelizing over tokens. CVB0, like the Gibbs sampler, is the core algorithm behind several scalable topic modeling systems. For instance, the Apache Spark machine-learning suite contains an implementation of CVB0.

Stochastic Cellular Atomaton for Topics

Stochastic cellular automata, also known as probabilistic cellular automata, or locally interacting Markov-chains, are a stochastic version of a discrete-time, discrete-space dynamical system in which a noisy local update rule is homogeneously and synchronously applied to every site of a discrete space.

With respect to the inference algorithms described above, it is worth noticing that Gibbs sampling and variational inference, despite being justified very differently, have at their core the very same formulas—i.e., the portion of the formulas after the '∝' symbol in both of Formulas (7) and (8).

According to embodiments, a stochastic cellular automaton ("SCA") is constructed, where the SCA has the formula common to Formulas (7) and (8) as its local update function and where latent variables correspond to the cells of the SCA. After enough simulation steps of the automaton, the parameters $\theta_m$ and $\phi_k$ are extracted from its state.

The parallel update dynamics of the stochastic cellular automaton provides an algorithm that is simple to parallelize and distribute. This approach is approximate with respect to the LDA model: the invariant measure of the SCA is not LDA itself (which is also the case for the parallel distributed versions of CGS and of variational inference in general).

The automaton, as a (stochastic) discrete-time, discrete-space dynamical system, is given by an evolution function $\varphi: [S] \rightarrow [S]$ over the state space $[S]$ The evolution function consists of applying a local function $\phi$ to every point in the space. The dynamics start with a state $s_0$ that is configured using the data to enable the learning of topics.

The state space $[S]$ is of the form $$[S]=[Z]\rightarrow[K]\times[M]\times[V] \quad (9)$$

where $[Z]$ is the set of cell identifiers (one per token in the corpus), $[K]$ is a set of K topics, $[M]$ is a set of M document identifiers, and $[V]$ is a set of V identifiers for the vocabulary words.

The initial state is the map defined as follows: for every occurrence of the word v in document m, a cell z is associated to the triple $(k_z, m, v)$ where $k_z$ is chosen uniformly at random from $[K]$ and independently from $k_{z'}$ for all $z'\neq z$. Formula (10) shows the initial state $s_0$ of state space $[S]$.

$$s_0 = z \mapsto (k_z, m, v) \quad (10)$$

With respect to the evolution function $\varphi$: first, assuming that there is a state s and a cell z, the following distribution is defined:

$$p_z(k \mid s) \propto (D_{mk} + \alpha) \times \frac{W_{kv} + \beta}{T_k + \beta V} \quad (11)$$

where $D_{mk}=|\{\exists v.\ s(z)=(k, m, v)\}|$, $W_{kv}=|\{z|\exists m.\ s(z)=(k, m, v)\}|$, and $T_k=|\{z|\exists m.\ \exists v.\ s(z)=(k, m, v)\}|$. Assuming that $s(z)=(k, m, v)$ and that k' is a sample from $p_z$ (hence the name "stochastic" cellular automaton), the local update function is defined as:

$$\phi(s,z)=(k',m,v) \text{ where } s(z)=(k,m,v) \text{ and } k' \sim p_z(\cdot|s) \quad (12)$$

That is, the document and word of the cell remain unchanged, but a new topic is chosen according to the distribution $p_z$ induced by the state. The evolution function of the stochastic cellular automaton is obtained by applying the function $\phi$ uniformly on every cell.

$$\Phi(s)=z \mapsto \phi(s,z) \quad (13)$$

Finally, the SCA algorithm simulates the evolution function $\Phi$ starting with $s_0$. An implementation can, for example, have two copies of the count matrices $D^i$, $W^i$, and $T^i$ for i=0 or 1 (as in CGS or CVB0, the values $D_{jk}$, $W_{kv}$, and $T_k$ are not computed, but the counts are tracked as topics are assigned to the cells/latent variables). During iteration i of the evolution function, $\Phi$ is applied by reading $D^{i \bmod 2}$, $W^{i \bmod 2}$, and $T^{i \bmod 2}$ and incrementing $D^{1-(i \bmod 2)}$, $W^{1-(i \bmod 2)}$, and $T^{1-(i \bmod 2)}$ as topics are assigned.

Note that a lattice structure is not defined over the cells of the cellular automaton. Indeed, even though it does have a regular structure (the grid forms an (N–1)-simplex where N is the total number of latent variables), there is no need to define a complicated neighborhood since the states of all other cells are simply counted. Such automata are sometimes called totalistic or counting automata (because each cell simply counts the states of its neighbors) and amorphous (because of the lack of a "crystalline" structure). While this terminology is seldom relevant to the problem, it may help in seeing the connection between the automaton described herein and more commonly used cellular automata that use, for example, a rectangular grid.

Relationships Between SCA and CGS and Between SCA and CVB0

The relationship between CGS and SCA is simple: SCA corresponds to the limit of AD-LDA (or YahooLDA) where every token belongs to its own partition. This amounts to making a generalized assumption of independence between the latent variables within an iteration of the Gibbs sampler. The positive consequences of such a choice for an implementation of SCA are many: as in CVB0, there is no need to store the latent variables themselves, only the sufficient statistics. As in Mean-for-Mode estimation (as described in U.S. application Ser. No. 14/599,272, called "Greedy Gibbs sampling" therein), sufficient statistics are tracked by increments only (counters are never decremented), which enables the use of approximate counters described in further detail below.

Because there are no reads and writes to the same structures, there is less need for synchronization and communication, which at scale can be significant. Importantly, this makes the implementation of Walker's alias method to sample from a discrete distribution even more effective. For more information on Walker's alias method, the following paper is referred to, and fully incorporated herein by reference: Walker, A. J. (1974). Fast generation of uniformly distributed pseudorandom numbers with floating-point representation. Electronics Letters, 10(25):533-534.

To elaborate, Formula (11) can be decomposed as:

$$p_z(k \mid s) \propto \left[D_{mk} \times \frac{W_{kv}+\beta}{T_k + \beta V}\right] + \left[\alpha \times \frac{W_{kv}+\beta}{T_k + \beta V}\right] \quad (14)$$

This decomposition indicates a possible smart division of labor by treating Formula (11) as a discrete mixture. The sampling procedure can be broken down into a two-step procedure. First, it is decided which term of Formula (14) to draw from by a simple biased coin toss, and one of two distinct sampling methods is used depending on which term was chosen. For the first term, $$\left[D_{mk} \times \frac{W_{kv} + \beta}{T_k + \beta V}\right]$$

observe that for a given document m, the row $D_m$. is likely to be sparse. This is intuitive, as a given document would most likely be about a handful of topics, rather than all possible K topics. So, a straightforward method can be used for this term.

The second term $$\left[\alpha \times \frac{W_{kv} + \beta}{T_k + \beta V}\right]$$

is not sparse, but is independent of the current document m and depends only on the W and T matrices. In the absence of simulated stochastic cellular automata described herein, and in order to use Walker's alias method for this second term, tables based on the W and T matrices are updated based on each assignment of a topic to a word.

However, as mentioned earlier and according to embodiments, during a given iteration i, only the values from the non-changing $W^{i \bmod 2}$ and $T^{i \bmod 2}$ matrices (i.e., from one of data structures 124A or 124B described in further detail below) will be read. As a result, at the start of each iteration tables can be precomputed, from the W and T matrices, for use with Walker's alias method. Because the counts, from which the tables are computed, do not change during a given iteration of the inference method, the tables need not be updated based on each assignment of a topic to a word during an iteration. The tables need only be computed at the start of each iteration. Using Walker's alias method to sample from the second term enables sampling from the second term in a mere three CPU operations. Thus, evolution of the SCA can be carried out in a highly efficient manner.

The relationship between CVB0 and SCA is simple as well: SCA corresponds to a field-approximation where independence of the latent variable is assumed, but where stochastic steps are used to choose topics instead of keeping track of variational parameters. According to embodiments, the consequences for such an embodiment are that there is no need to keep track of and update all the gamma values, and the same kind of bookkeeping as in Gibbs sampling can be utilized. That means that when processing a word, for each of the matrices (D, W, and T), only a single memory access is needed rather than K memory accesses (one per topic). Such reduced pressure on the memory bandwidth can improve performance significantly for highly parallel applications.

Efficient Implementation Using Sufficient Statistics

According to embodiments, the key idea is to learn topics and reduce the dimensionality of documents by designing and simulating a stochastic cellular automaton. To decide whether the simulation has been running long enough, the evolution of the average entropy of the topics is computed after each simulation step, or the perplexity is measured as it is attempted to predict words in a distinct set of documents.

FIG. 2 depicts a flowchart 200 for an inference algorithm, running over a Dirichlet distribution, that utilizes two data structures storing copies of counter values such that each iteration of the inference algorithm reads counter values from one data structure and updates counter values in the other.

At step 202, information is received for a set of documents, i.e., document set 142 (database 140), where the set of documents comprises a plurality of words, and the particular document of the set of documents comprises a particular word of the plurality of words. For example, a user provides information about document set 142 to sampling client 112 (client device 110). In this example, document set 142 is a set of web pages gathered by a web crawler. Sampling client 112 provides the information to sampling service 122 (of server device 120).

Document set 142 includes one or more documents, where each document includes words. As such, each particular document in document set 142 includes words that may be correlated by a Gibbs sampler. According to an embodiment, a user also provides sampling service 122 a number of topics (K) into which the Gibbs sampler should correlate the words from document set 142.

At step 204, an inference algorithm is run over a Dirichlet distribution of the plurality of words in the set of documents. For example, sampling service 122 runs one of CGS, CBV0, an uncollapsed Gibbs sampler, a Mean-for-Mode Gibbs sampler, etc., over a Dirichlet distribution of the plurality of words in document set 142. Running the inference algorithm comprises at least steps 206-210 of flowchart 200.

At step 206, a first counter value is retrieved from a first data structure. For example, in a previous iteration of the inference algorithm, sampling service 122 populated data structure 124A with counter values based in assignments of topics to words in document set 142. Once data structure 124A is populated with the counter values for a particular iteration of the inference algorithm, sampling service 122 clears (or sets to 0) all of the counter values in data structure 124B to prepare it to receive the counter values for the next iteration of the inference algorithm. The following is an illustration of the use of counters in CGS.

In collapsed Gibbs sampling, arrays of counters are maintained (in addition to the actual text corpus w, which is also an array), which summarize, in various ways, the assignments of z variables according to the most recent iteration of the CGS algorithm. The array topicCounts (referred to as W above) is a two-dimensional array of counters indexed by topic number and word within a vocabulary, and it records, for each topic and word, how many occurrences of that word in the document corpus have been assigned that topic. Similarly, documentCounts (referred to as D above) is a two-dimensional array of counters indexed by document number and topic number, and it records, for each topic and document, how many word occurrences in that document have been assigned that topic. Finally, a summary array of counters called topicAssignments (referred to as T above) is maintained, i.e., by incremental updates, such that topicAssignments[j]=$\Sigma_i$ topicCounts[i, j].

Returning to the description of step 206, sampling service 122 examines counter values for topicCounts and documentCounts by retrieving the counter values stored in data structure 124A. According to an embodiment, sampling service 122 tracks which data structure stores the current set of counters to be examined.

At step 208, a particular topic, of a plurality of topics, is assigned to the particular word in the particular document, to produce a topic assignment for the particular word, based, at least in part, on the first counter value. For example, during the iteration of the inference algorithm, sampling service 122 randomly chooses a new topic assignment for a particular word in the corpus, where the relative probabilities of the possible values (topic numbers) are calculated by examining the counter values for topicCounts and documentCounts retrieved from data structure 124A. A newly chosen z value represents a new random choice j' of topic for a given word i occurring in a given document k.

At step 210, after assigning the particular topic to the particular word, a second counter value is updated in a second data structure; wherein the second counter value reflects the topic assignment; and wherein the first data structure is distinct from the second data structure. For example, after sampling service 122 chooses the new random choice j' of topic for the given word, sampling service 122 increments the counters in data structure 124B, i.e., topicCounts[i, j'], topicAssignments[j'], and documentCounts[k, j'] are incremented in data structure 124B. The counts in data structure 124A are not updated during this iteration of the inference algorithm, since they are the counts on which the topic assignments are based during the iteration.

After updating the counter values in data structure 124B, sampling service 122 initializes the next iteration of the inference algorithm, at least partly by clearing the counter values in data structure 124A. During the next iteration, sampling service 122 will assign new topics to words in the corpus based on counter values it will read from data structure 124B and then it will write the resulting counts to data structure 124A.

Drawing Latent Variables in Parallel

In the absence of the simulation of stochastic cellular automata described in connection with flowchart 200, the collapsed Gibbs sampling strategy is sequential. In such a traditional CGS, it is important that elements of z be processed sequentially, so that after a new z value is chosen, the counters are updated before the next new z value is chosen. If the z values are not processed sequentially, then the computation typically requires many more iterations to converge, and moreover the quality of the computed result suffers.

However, when the inference algorithm reads from a first data structure ("source data structure") and writes to a second distinct data structure ("update data structure"), the latent variables may be drawn in parallel because the data from which the inference algorithm reads does not change based on each variable draw as would occur in a conventional implementation of CGS. In other words, the counter values stored in the source data structure can be considered as "frozen in time" and all z variables may be drawn in parallel based on the counter values stored therein (as if the counter values in the source data structure were the state of the counter values when it would be a given z variable's "turn" to be sampled in series).

All of the updates to the counter values are performed on the update data structure and not on counter values in the source data structure. Furthermore, little synchronization is needed between threads updating counter values. Specifically, threads performing an embodiment would need to be synchronized when the threads update the same topic for the same word. Such synchronization ensures that the increments being performed by all threads are effectuated in the update data structure.

According to embodiments, an array representing the topics that have been picked for the words in the corpus (or z array) does not need to be stored. For example, an embodiment using CGS requires only the counter values for topicCounts, topicAssignments, and documentCounts in order to draw topics for the words in the corpus. Furthermore, since there is no need to decrement counters, in the arrays of counters, that relate to the previous topic to which a word was assigned, the previously assigned topic values do not need to be stored. An array that represents the topics that have been picked for the words in the corpus requires a large amount of memory (since it has an entry for each word in the corpus), and not having to store this array frees up memory on the implementing system.

Approximate Counters

Embodiments, such as embodiments using CGS, do not require storage of the parameters θ and ϕ, which would have to be stored as floats. Instead, sampling service 122 need store only counter values for each iteration of the inference algorithm, according to embodiments herein.

Typically counter values are stored as 32-bit integers. According to embodiments, in order to decrease the amount of memory required for the inference algorithm, approximate counters are substituted for more conventional counters used in these tasks.

An approximate counter is a probabilistic counting algorithm that uses probabilistic techniques to increment the counter. The intuitive idea of approximate counters is to estimate the order of magnitude of the number of increments to the counters. As the simplest example, to increment an approximate counter whose current value is X, the approximate counter increments X with a probability $2^{-X}$, and otherwise the count is not incremented. In the end, a statistically reasonable estimate of the number of increment attempts on the approximate counter is $2^X-1$. This idea can be improved in different ways to allow for different levels of precision (according to Morris approximate counters) or to have a behavior similar to that of a floating-point representation (according to Csűrös approximate counters).

For more information on Morris and Csűrös approximate counters, see the following two documents, the contents of each of which are incorporated herein by reference: Robert Morris. Counting large numbers of events in small registers. *Commun. ACM*, 21(10):840-842, October 1978. Miklós Csűrös. Approximate counting with a floating-point counter. In *Proceedings of the 16th Annual International Conference on Computing and Combinatorics*, COCOON'10, pages 358-367, Berlin, Heidelberg, 2010. Springer-Verlag.

Finally, there are other representations and algorithms for approximate counters, such as the two presented by Dice, Lev, and Moir (one in which the representation is similar to that of Csűrös, and one in which the representation in the counter is the probability that the counter value should change on an incrementation operation). According to an embodiment, a Dice, Lev, and Moir approximate counter is used to represent counters. For more information on Dice, Lev, and Moir approximate counters, see the following document, the contents of which are incorporated herein by reference: Dave Dice, Yossi Lev, and Mark Moir. Scalable statistics counters. In *Proceedings of the 18th ACM SIGPLAN Symposium on Principles and Practice of Parallel Programming*, PPoPP '13, pages 307-308, New York, N.Y., USA, 2013. ACM.

Embodiments further use a mixture of types of approximate counters. For example using general Morris approximate counters in the topicCounts array, using Csűrös approximate counters in the documentCounts array, and using ordinary 32-bit integer counters in the topicAssignments array.

The benefit of using approximate counters is the potential to greatly reduce the amount of memory required to store counts, since a probabilistic counter requires less memory than a conventional counter. For instance, a conventional counter requires 32 bits and approximate counters can be represented with up to 16 bits per counter, and generally with as few as 8 or even 4 bits per counter.

Results of Running the Inference Algorithm

Returning to flowchart 200, at step 212, one or more sets of correlated words are determined from the sampler result data. For example, sampling service 122 continues to run the inference algorithm over the data in document set 142 until a satisfactory level of convergence is detected. A satisfactory level of convergence may be detected based on one or more of: a number of iterations of the inference algorithm, the likelihood of the parameters does not increase significantly anymore, the perplexity of the parameters does not decrease anymore, etc.

Once convergence is reached, sampling service 122 has, through the inference algorithm, assigned each word of the plurality of words in each document of document set 142 a particular topic. According to an embodiment, the plurality of words is less than all of the words in the documents of document set 142. According to an embodiment, the plurality of words is all of the words in the documents of document set 142. According to embodiments, sampling service 122 returns, to sampling client 112, information for K number of lists of correlated words identified from document set 142.

According to an embodiment, the sets of correlated words are not automatically associated with topic names, interpretations of the identified correlations, etc. Specifically, the word groupings are based on correlations that were automatically detected, by the inference algorithm, in the given set of documents. For example, sampling service 122 identifies a correlation between two words based on the inclusion of the two words together in a single document of document set 142. In a similar vein, sampling service 122 identifies a strong correlation between the two words based on the inclusion of the two words together in each of multiple documents. As a further example, sampling service 122 identifies a strong correlation between the two words based on the inclusion of two words together in the same sentence in one or more of the documents.

Implementation Details

Embodiments may be implemented on server devices configured with one or more Central Processing Units (CPU), and/or highly-parallel architectures, such as one or more Graphics Processor Units (GPU), given the independence assumptions that facilitate parallelism within embodiments.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
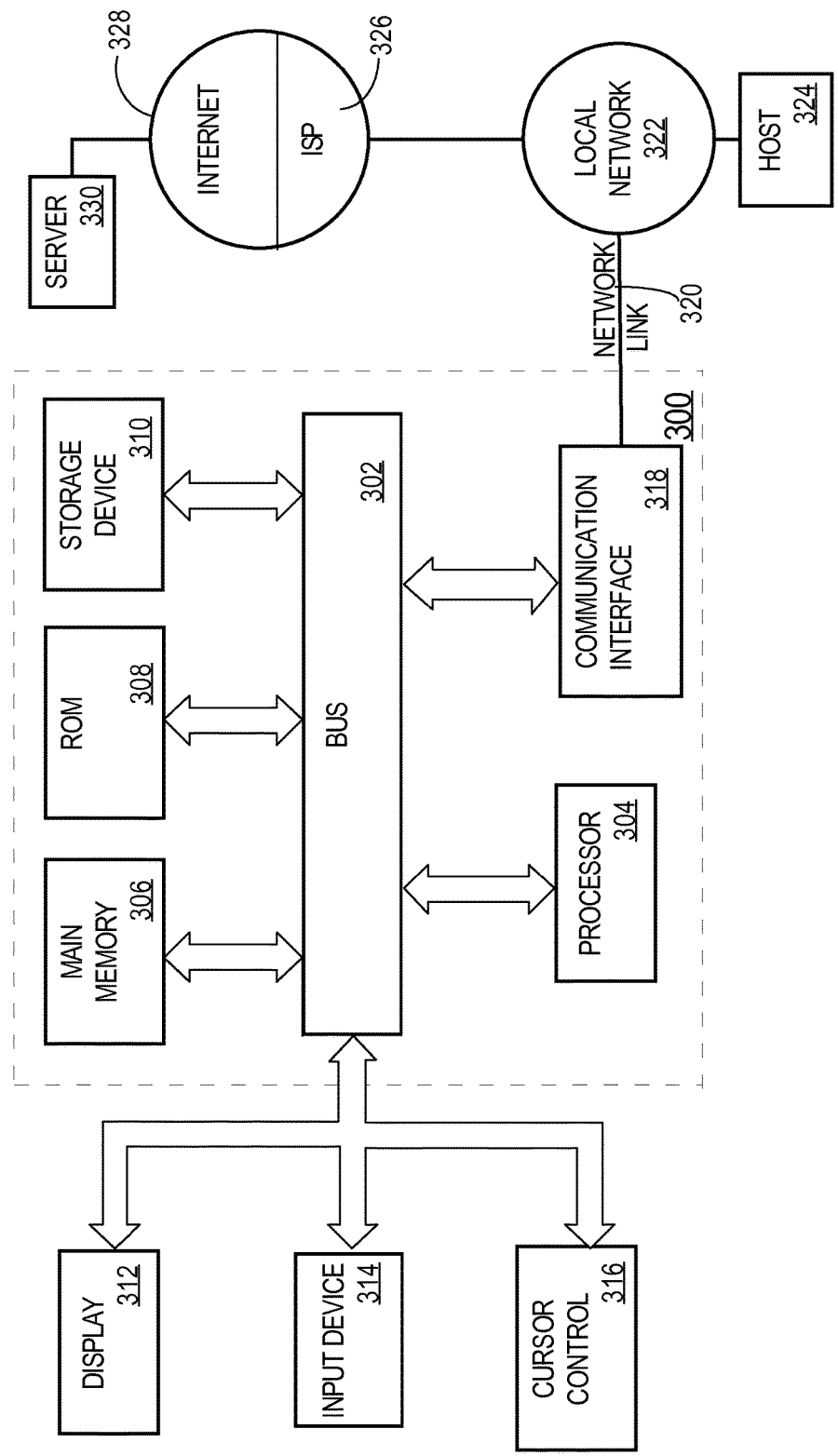
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for identifying sets of correlated words comprising:
   receiving information for a set of documents;
   wherein the set of documents comprises a plurality of words;
   wherein a particular document of the set of documents comprises a particular word of the plurality of words;
   running an inference algorithm over a Dirichlet distribution of the plurality of words in the set of documents to produce sampler result data, further comprising:
      retrieving a first counter value from a first data structure,
      based, at least in part, on the first counter value, assigning a particular topic, of a plurality of topics, to the particular word in the particular document to produce a topic assignment for the particular word,
      after assigning the particular topic to the particular word, updating a second counter value in a second data structure to produce an updated second counter value,
      wherein the updated second counter value reflects the topic assignment, and
      wherein the first data structure is stored and accessed independently from the second data structure; and
   determining, from the sampler result data, one or more sets of correlated words;
   wherein the method is performed by one or more computing devices.

2. The method of claim 1, wherein the inference algorithm is one of: Mean-for-Mode Gibbs sampling, and collapsed variational Bayesian inference.

3. The method of claim 1, further comprising:
   performing one or more of a particular group of steps in parallel with one or more of the steps of retrieving, assigning, and updating;
   wherein the particular group of steps comprises:
      retrieving a third counter value from the first data structure;
      based, at least in part, on the third counter value, assigning a second topic, of the plurality of topics, to a second word, of the plurality of words, to produce a topic assignment for the second word; and
      after assigning the second topic to the second word, updating a fourth counter value, in the second data structure, to reflect the topic assignment for the second word;
      wherein the fourth counter value reflects the topic assignment for the second word.

4. The method of claim 1, wherein one or more of said first counter value and said second counter value are represented as approximate counter values.

5. The method of claim 1, further comprising:
   prior to performing an iteration of the inference algorithm that includes said steps of retrieving, assigning, and updating:
      calculating values for one or more tables based on counts in the first data structure;
      wherein assigning the particular topic to the particular word comprises performing Walker's "alias method" based on the one or more tables.

6. The method of claim 1, wherein assigning the particular topic to the particular word is performed without respect to one or more of parameters theta and phi.

7. The method of claim 1, wherein assigning the particular topic to the particular word is performed without respect to stored values indicating previous assignments of words to topics.

8. One or more non-transitory computer-readable media storing instructions, which, when executed by one or more processors, cause:
- receiving information for a set of documents;
- wherein the set of documents comprises a plurality of words;
- wherein a particular document of the set of documents comprises a particular word of the plurality of words;
- running an inference algorithm over a Dirichlet distribution of the plurality of words in the set of documents to produce sampler result data, further comprising:
  - retrieving a first counter value from a first data structure,
  - based, at least in part, on the first counter value, assigning a particular topic, of a plurality of topics, to the particular word in the particular document to produce a topic assignment for the particular word,
  - after assigning the particular topic to the particular word, updating a second counter value in a second data structure to produce an updated second counter value,
  - wherein the updated second counter value reflects the topic assignment, and
  - wherein the first data structure is stored and accessed independently from the second data structure; and
- determining, from the sampler result data, one or more sets of correlated words.

9. The one or more non-transitory computer-readable media of claim 8, wherein the inference algorithm is one of: Mean-for-Mode Gibbs sampling, and collapsed variational Bayesian inference.

10. The one or more non-transitory computer-readable media of claim 8, wherein the instructions further comprise instructions, which, when executed by one or more processors, cause:
- performing one or more of a particular group of steps in parallel with one or more of the steps of retrieving, assigning, and updating;
- wherein the particular group of steps comprises:
  - retrieving a third counter value from the first data structure;
  - based, at least in part, on the third counter value, assigning a second topic, of the plurality of topics, to a second word, of the plurality of words, to produce a topic assignment for the second word; and
  - after assigning the second topic to the second word, updating a fourth counter value, in the second data structure, to reflect the topic assignment for the second word;
  - wherein the fourth counter value reflects the topic assignment for the second word.

11. The one or more non-transitory computer-readable media of claim 8, wherein one or more of said first counter value and said second counter value are represented as approximate counter values.

12. The one or more non-transitory computer-readable media of claim 8, wherein the instructions further comprise instructions, which, when executed by one or more processors, cause:
- prior to performing an iteration of the inference algorithm that includes said steps of retrieving, assigning, and updating:
  - calculating values for one or more tables based on counts in the first data structure;
  - wherein assigning the particular topic to the particular word comprises performing Walker's "alias method" based on the one or more tables.

13. The one or more non-transitory computer-readable media of claim 8, wherein assigning the particular topic to the particular word is performed without respect to one or more of parameters theta and phi.

14. The one or more non-transitory computer-readable media of claim 8, wherein assigning the particular topic to the particular word is performed without respect to stored values indicating previous assignments of words to topics.

* * * * *

UNITED STATES PATENT AND TRADEMARK OFFICE
CERTIFICATE OF CORRECTION

PATENT NO. : 10,394,872 B2
APPLICATION NO. : 14/932825
DATED : August 27, 2019
INVENTOR(S) : Tristan et al.

It is certified that error appears in the above-identified patent and that said Letters Patent is hereby corrected as shown below:

On the Title Page

On page 2, Column 1, under Other Publications, Line 21, delete "oating-" and insert -- floating- --, therefor.

On page 2, Column 2, under Other Publications, Line 9, delete "accesed" and insert -- accessed --, therefor.

On page 2, Column 2, under Other Publications, Line 44, delete "Monteral," and insert -- Montreal, --, therefor.

In the Specification

In Column 1, Line 8, delete "62/168,608 ," and insert -- 62/168,608, --, therefor.

In Column 1, Line 14, delete "14/599,272 ," and insert -- 14/599,272, --, therefor.

In Column 1, Line 18, delete "14/820,169 ," and insert -- 14/820,169, --, therefor.

In Column 1, Line 22, delete "14/755,312 ," and insert -- 14/755,312, --, therefor.

In Column 5, Line 17, delete "$W_{mn}$" and insert -- $w_{mn}$ --, therefor.

In Column 5, Line 18, delete "$Z_{mn}$" and insert -- $z_{mn}$ --, therefor.

In Column 7, Line 7, delete "Atomaton" and insert -- Automaton --, therefor.

In Column 9, Line 8, delete "$D_m$." and insert -- $D_m$ --, therefor.

Signed and Sealed this
Thirteenth Day of October, 2020

Andrei Iancu
*Director of the United States Patent and Trademark Office*

In Column 9, Line 21, delete "Wand" and insert -- W and --, therefor.

In Column 9, Line 32, delete "Wand" and insert -- W and --, therefor.